(12) United States Patent
Han et al.

(10) Patent No.: US 10,902,815 B2
(45) Date of Patent: Jan. 26, 2021

(54) REFLECTIVE LIQUID CRYSTAL DISPLAY AND GRAYSCALE VOLTAGE GENERATOR CONFIGURED TO GENERATE GRAYSCALE VOLTAGES BASED ON THE DRIVING VOLTAGE-REFLECTION RATIO PROPERTY

(71) Applicant: SAMSUNG DISPLAY CO, LTD., Yongin-si (KR)

(72) Inventors: Eunhee Han, Seoul (KR); Seunghyun Park, Seoul (KR); Jonghwan Park, Hwaseong-si (KR); Young Je Cho, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/261,004

(22) Filed: Jan. 29, 2019

(65) Prior Publication Data
US 2019/0259348 A1    Aug. 22, 2019

(30) Foreign Application Priority Data
Feb. 19, 2018  (KR) .......................... 10-2018-0019565

(51) Int. Cl.
*G02F 1/1343*     (2006.01)
*G09G 3/36*       (2006.01)
*G02F 1/1345*     (2006.01)

(52) U.S. Cl.
CPC .......... *G09G 3/3685* (2013.01); *G02F 1/1343* (2013.01); *G02F 1/13454* (2013.01); *G09G 3/3688* (2013.01); *G02F 2001/134345* (2013.01); *G09G 3/3696* (2013.01); *G09G 2310/027* (2013.01); *G09G 2320/0252* (2013.01); *G09G 2320/0673* (2013.01)

(58) Field of Classification Search
CPC .......... G09G 3/3685; G09G 3/36; G09G 3/20; G09G 5/02; G09G 5/10; G02G 1/133; G02G 1/1335
See application file for complete search history.

(56) References Cited

U.S. PATENT DOCUMENTS

| 6,600,470 B1 * | 7/2003 | Tsuda ........................ G09G 3/36 345/102 |
| 2002/0105609 A1 * | 8/2002 | Moon ............... G02F 1/133514 349/113 |

(Continued)

FOREIGN PATENT DOCUMENTS

| KR | 10-0467819 | 1/2005 |
| KR | 10-0535801 | 12/2005 |
| KR | 10-2013-0105532 | 9/2013 |

*Primary Examiner* — Jennifer Mehmood
*Assistant Examiner* — James S Nokham
(74) *Attorney, Agent, or Firm* — F. Chau & Associates, LLC

(57) ABSTRACT

A liquid crystal display device includes a reflective liquid crystal display panel and a panel driver configured to generate a driving voltage to drive the reflective liquid crystal display panel. The panel driver generates grayscale voltages having a voltage level between a first voltage and a second voltage based on a driving voltage-reflection ratio property in which a reflection ratio increases when the driving voltage increases to the first voltage and the reflection ratio decreases when the driving voltage increases from the first voltage to the second voltage.

17 Claims, 7 Drawing Sheets

(56) References Cited

U.S. PATENT DOCUMENTS

| | | | |
|---|---|---|---|
| 2003/0210216 A1* | 11/2003 | Kim | G09G 3/2011 345/87 |
| 2006/0109233 A1* | 5/2006 | Lee | G09G 3/3611 345/102 |
| 2006/0109391 A1* | 5/2006 | Huitema | G09G 3/3611 349/19 |
| 2008/0129760 A1* | 6/2008 | Phan | G09G 3/342 345/690 |
| 2008/0165309 A1* | 7/2008 | Ge | G09G 3/3648 349/85 |
| 2009/0009447 A1* | 1/2009 | Naka | G09G 3/3648 345/87 |
| 2012/0182486 A1* | 7/2012 | Haruyama | H04N 9/317 349/5 |

* cited by examiner

FIG. 5

|  |  | RISETIME(MS) | | | | | | | |
|---|---|---|---|---|---|---|---|---|---|
|  |  | 1 | 2 | 3 | 4 | 5 | 6 | 7 | 8 |
| DECAY TIME(MS) | 1 |  | 124.5 | 90.7 | 72.1 | 58 | 45.7 | 33.1 | 11.3 |
|  | 2 | 15.5 |  | 69.4 | 58.9 | 49.2 | 39.8 | 29.2 | 9.6 |
|  | 3 | 15.7 | 70.8 |  | 53.6 | 45.5 | 37 1 | 27.5 | 8.6 |
|  | 4 | 16.1 | 64.4 | 57.5 |  | 43.4 | 35.7 | 26.6 | 8 |
|  | 5 | 16.7 | 60.2 | 54.7 | 48.5 |  | 34.9 | 26.2 | 7.4 |
|  | 6 | 17.5 | 57.4 | 52.9 | 47.4 | 41.3 |  | 26.2 | 7.0 |
|  | 7 | 18.6 | 55.8 | 52.1 | 47 1 | 41.6 | 35.2 |  | 6.4 |
|  | 8 | 20.5 | 55.9 | 53 | 48.7 | 43.8 | 38.3 | 33.1 |  |

REFLECTIVE LIQUID CRYSTAL DISPLAY AND GRAYSCALE VOLTAGE GENERATOR CONFIGURED TO GENERATE GRAYSCALE VOLTAGES BASED ON THE DRIVING VOLTAGE-REFLECTION RATIO PROPERTY

CROSS-REFERENCE TO RELATED APPLICATION

This application claims priority under 35 U.S.C. § 119 to Korean Patent Application No. 10-2018-0019565, filed on Feb. 19, 2018 in the Korean Intellectual Property Office (KIPO), the disclosure of which is incorporated by reference herein in its entirety.

TECHNICAL FIELD

Exemplary embodiments of the inventive concept relate to a driving device of a liquid crystal display panel and a liquid crystal display device having the same.

DISCUSSION OF RELATED ART

A liquid crystal display (LCD) device forms an electric field through a liquid crystal layer disposed between two substrates, changes an arrangement of liquid crystal molecules, and displays an image on a liquid crystal display panel. LCD devices may be classified into transmissive LCD devices that display an image using an external light source and reflective LCD devices that display an image using natural light instead of an external light source. Power consumption of reflective LCD devices is lower than that of transmissive LCD devices. Further, display quality of reflective LCD devices in open air is better than that of transmissive LCD devices. Additionally, reflective LCD devices do not require an additional light source such as a backlight, and thus may be thin and light.

SUMMARY

According to an exemplary embodiment of the inventive concept, a liquid crystal display device may include a reflective liquid crystal display panel and a panel driver configured to generate a driving voltage to drive the reflective liquid crystal display panel. The panel driver may generate grayscale voltages having a voltage level between a first voltage and a second voltage based on a driving voltage-reflection ratio property in which a reflection ratio increases when the driving voltage increases to the first voltage and the reflection ratio decreases when the driving voltage increases from the first voltage to the second voltage.

In an exemplary embodiment of the inventive concept, the reflective liquid crystal display panel may include a first substrate including a first base substrate, a thin film transistor disposed on the first base substrate, a color filter layer disposed on the thin film transistor, a pixel electrode disposed on the color filter layer and electrically connected to a drain electrode of the thin film transistor, and a reflection sheet disposed between the thin film transistor and the color filter layer and configured to reflect external light, a second substrate including a second base substrate facing the first base substrate, a common electrode disposed on a first surface of the second base substrate, and a light control film disposed on a second surface of the second base substrate opposite to the first surface, and a liquid crystal layer disposed between the first substrate and the second substrate.

In an exemplary embodiment of the inventive concept, liquid crystal molecules in the liquid crystal layer may be aligned in a vertical aligned (VA) mode.

In an exemplary embodiment of the inventive concept, the reflective display panel may be a normal black mode.

In an exemplary embodiment of the inventive concept, a voltage level of the first voltage may be lower than a voltage level of the second voltage.

In an exemplary embodiment of the inventive concept, the panel driver may include a memory configured to store the first voltage and the second voltage, and a grayscale voltage generator configured to generate the grayscale voltages using the first voltage and the second voltage.

In an exemplary embodiment of the inventive concept, the first voltage may correspond to a maximum grayscale voltage and the second voltage may correspond to a minimum grayscale voltage.

In an exemplary embodiment of the inventive concept, the panel driver may generate the grayscale voltages having a voltage level between the first voltage and the second voltage and the grayscale voltages having a voltage level between a lowest voltage and a third voltage based on the driving voltage-reflection ratio property that further includes the third voltage lower than the first voltage and having a reflection ratio corresponding to the second voltage.

In an exemplary embodiment of the inventive concept, a voltage level of the first voltage may be higher than a voltage level of the third voltage, and a voltage level of the second voltage may be higher than the voltage level of the first voltage.

In an exemplary embodiment of the inventive concept, the memory may be further configured to store the third voltage, and the grayscale voltage generator may be further configured to generate the grayscale voltages using the third voltage and the lowest voltage.

In an exemplary embodiment of the inventive concept, the first voltage may correspond to a maximum grayscale voltage, the lowest voltage may correspond to a minimum grayscale voltage, and the second voltage and the third voltage may correspond to a grayscale voltage lower than the maximum grayscale voltage and higher than the minimum grayscale voltage.

According to an exemplary embodiment of the inventive concept, a driving device of a reflective liquid crystal display panel may include a memory configured to store a first voltage and a second voltage based on a driving voltage-reflection ratio property of the reflective liquid crystal display panel in which a reflection ratio increases when a driving voltage increases to the first voltage and the reflection ratio decreases when the driving voltage increases from the first voltage to the second voltage, and a grayscale voltage generator configured to generate grayscale voltages using the first voltage and the second voltage.

In an exemplary embodiment of the inventive concept, the reflective liquid crystal display panel may be a normal black mode.

In an exemplary embodiment of the inventive concept, a voltage level of the first voltage may be lower than a voltage level of the second voltage.

In an exemplary embodiment of the inventive concept, the first voltage may correspond to a maximum grayscale voltage, and the second voltage may correspond to a minimum grayscale voltage.

In an exemplary embodiment of the inventive concept, the memory may store the first voltage, the second voltage, and a third voltage based on the driving voltage-reflection ratio property that further includes the third voltage lower than the first voltage and having a reflection ratio corresponding to the second voltage, and the grayscale voltage generator may generate the grayscale voltages having a voltage level between the first voltage and the second voltage and the grayscale voltages having a voltage level between a lowest voltage and the third voltage.

In an exemplary embodiment of the inventive concept, a voltage level of the first voltage may be higher than a voltage level of the third voltage, and a voltage level of the second voltage may be higher than the voltage level of the first voltage.

In an exemplary embodiment of the inventive concept, the first voltage may correspond to a maximum grayscale voltage, the lowest voltage may correspond to a minimum grayscale voltage, and the second voltage and the third voltage may correspond to a grayscale voltage lower than the maximum grayscale voltage and higher than the minimum grayscale voltage.

According to an exemplary embodiment of the inventive concept, a liquid crystal device may include a reflective liquid crystal display panel, a memory configured to store and provide a first voltage, a second voltage, and a third voltage, a grayscale voltage generator configured to receive the first voltage, the second voltage, and the third voltage, and generate grayscale voltages having a voltage level between the first voltage and the second voltage and grayscale voltages having a voltage level between a lowest voltage and the third voltage, and a data driver configured to output a data signal to the reflective liquid crystal display panel using the grayscale voltages. A voltage level of the first voltage may be higher than a voltage level of the third voltage, and a voltage level of the second voltage may be higher than the voltage level of the first voltage.

In an exemplary embodiment of the inventive concept, the first voltage may correspond to a maximum grayscale voltage, the lowest voltage may correspond to a minimum grayscale voltage, and the second voltage and the third voltage may correspond to a grayscale voltage lower than the maximum grayscale voltage and higher than the minimum grayscale voltage.

BRIEF DESCRIPTION OF THE DRAWINGS

The above and other features of the inventive concept will be more clearly understood by describing in detail exemplary embodiments thereof with reference to the accompanying drawings.

FIG. 5 is a chart illustrating an operation property of the reflective liquid crystal display panel included in the liquid crystal display device of FIG. 1 according to an exemplary embodiment of the inventive concept.

DETAILED DESCRIPTION OF THE EMBODIMENTS

Figure 1:
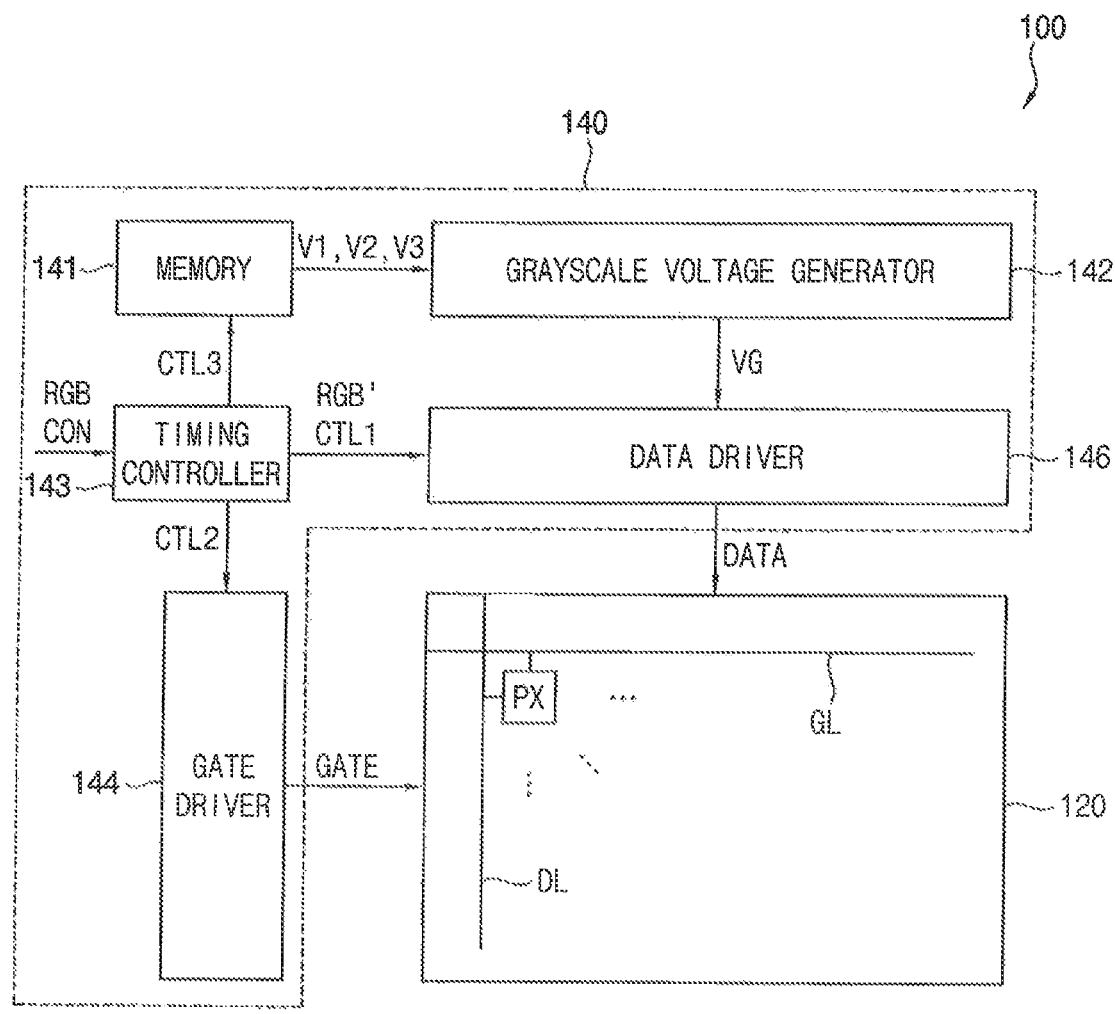
FIG. 1 is a block diagram illustrating a liquid crystal display device according to an exemplary embodiment of the inventive concept.
Figure 1:
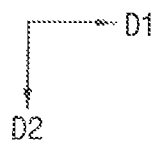

Exemplary embodiments of the inventive concept provide a liquid crystal display device capable of improving display quality.

Exemplary embodiments of the inventive concept also provide a driving device of the liquid crystal display panel capable of improving display quality Hereinafter, exemplary embodiments of inventive concept will be explained in detail with reference to the accompanying drawings Like reference numerals may refer to like elements throughout this application.

Figure 2:
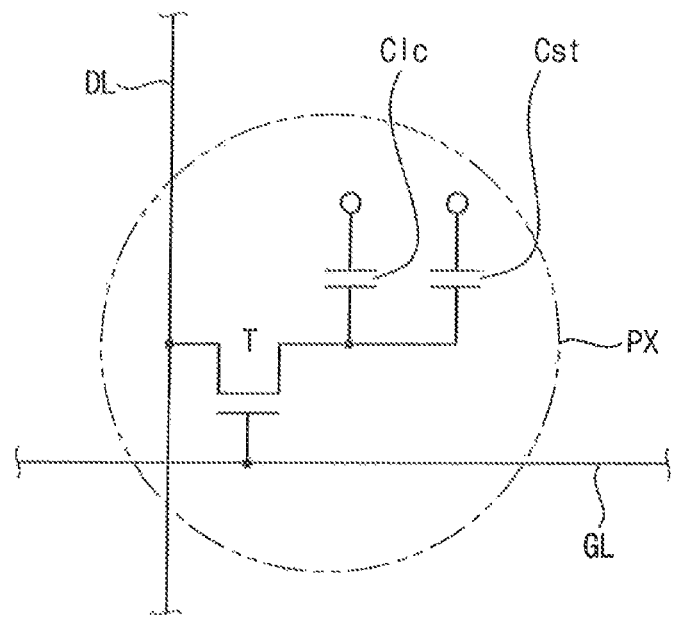
FIG. 2 is a circuit diagram illustrating a pixel of a reflective liquid crystal display panel included in the liquid crystal display device of FIG. 1 according to an exemplary embodiment of the inventive concept.
Figure 3:
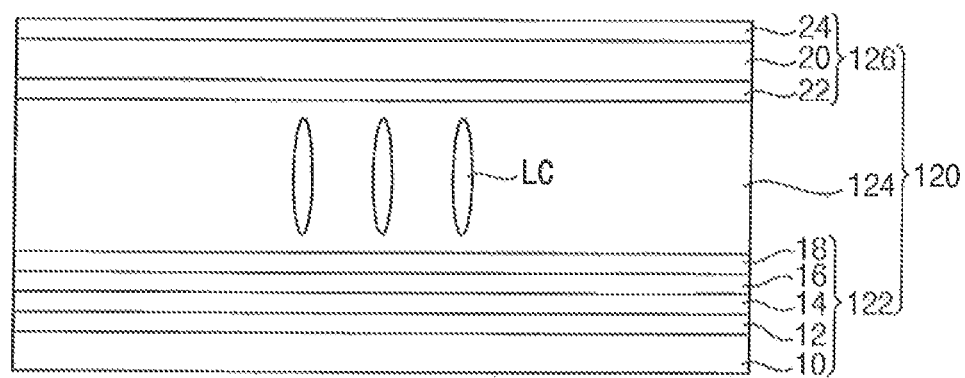
FIG. 3 is a diagram illustrating the reflective liquid crystal display panel included in the liquid crystal display device of FIG. 1 according to an exemplary embodiment of the inventive concept.
Figure 4A:
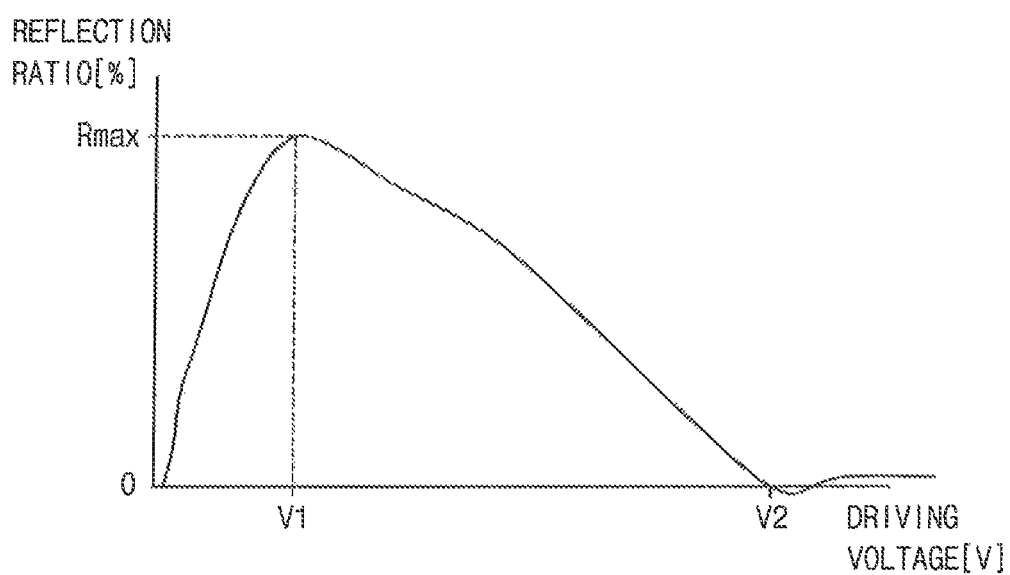
FIGS. 4A and 4B are graphs illustrating a driving voltage-reflective ratio property of the reflective liquid crystal display panel included in the liquid crystal display device of FIG. 1 according to exemplary embodiments of the inventive concept.
Figure 4B:
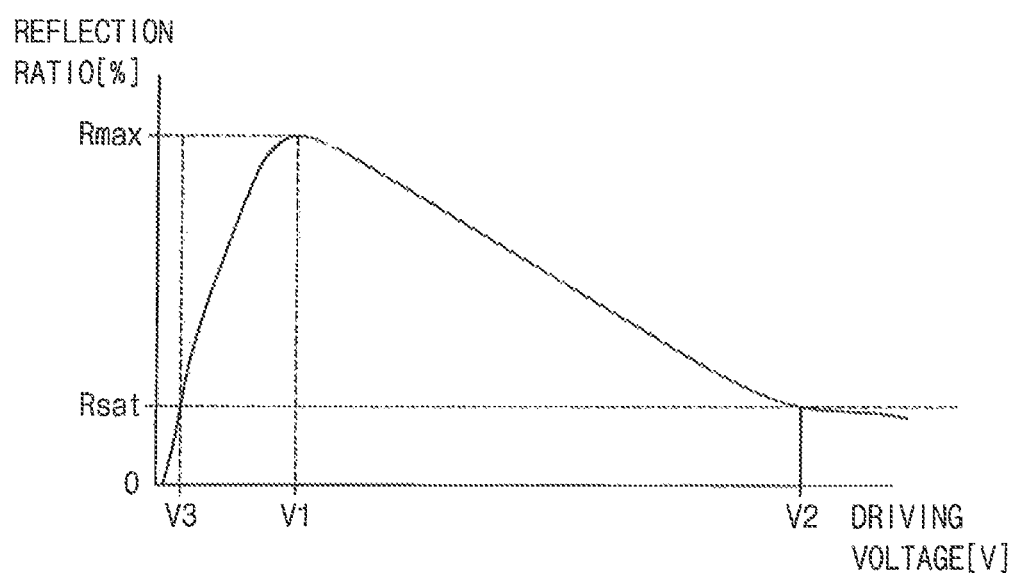

FIG. 1 is a block diagram illustrating a liquid crystal display device according to an exemplary embodiment of the inventive concept. FIG. 2 is a circuit diagram illustrating a pixel of a reflective liquid crystal display panel included in the liquid crystal display device of FIG. 1 according to an exemplary embodiment of the inventive concept. FIG. 3 is a diagram illustrating the reflective liquid crystal display panel included in the liquid crystal display device of FIG. 1 according to an exemplary embodiment of the inventive concept. FIGS. 4A and 4B are graphs illustrating a driving voltage-reflective ratio property of the reflective liquid crystal display panel included in the liquid crystal display device of FIG. 1 according to exemplary embodiments of the inventive concept.

Referring to FIG. 1, a liquid crystal display device 100 may include a reflective liquid crystal display panel 120 and a panel driver 140.

The reflective liquid crystal display panel 120 may not include an additional light source such as a backlight unit and may display an image by reflecting incident light using natural light. The reflective liquid crystal display panel 120 may include a plurality of data lines DL, a plurality of gate lines GL, and a plurality of pixels PX. The gate lines GL may extend in a first direction D1 and be arranged in a second direction D2 substantially perpendicular to the first direction D1. The data lines DL may extend in the second direction D2 and be arranged in the first direction D1. The first direction D1 may be parallel with a long side of the reflective liquid crystal display panel 120, and the second direction D2 may be parallel with a short side of the reflective liquid crystal display panel 120. Each of the pixels PX may be formed in an intersection region of one of the data lines DL and one of the gate lines GL. For example, each of the pixels PX may include a thin film transistor T electrically coupled to the gate line GL and the data line DL, a liquid crystal capacitor Clc, and a storage capacitor Cst coupled to the thin film transistor, as illustrated in FIG. 2.

Referring to FIG. 3, the reflective liquid crystal display panel 120 may include a first substrate 122, a second substrate 126, and a liquid crystal layer 124. The first substrate 122 may include a first base substrate 10, a thin film transistor 12 (e.g., a layer on which the thin film transistors T are formed) disposed on the first base substrate 10, a color filter layer 16 disposed on the thin film transistor 12, a pixel electrode 18 (e.g., a layer on which pixel electrodes are formed) disposed on the color filter layer 16 and electrically connected to a drain electrode of the thin film transistor 12, and a reflection sheet 14 disposed between the thin film transistor 12 and the color filter layer 16 and configured to reflect external light. The second substrate 126 may include a second base substrate 20 facing the first base substrate 10, a common electrode 22 (e.g., a layer on which common electrodes are formed) disposed on a first surface of the second base substrate 20, and a light control film 24 disposed on a second surface of the second base substrate 20 opposite to the first surface. The liquid crystal layer 124 may be formed between the first substrate 122 and the second substrate 126. Liquid crystal molecules LC may be arranged in the liquid crystal layer 124 and an alignment of the liquid crystal molecules LC may be changed based on a driving voltage applied to the pixel electrode 18 and the common electrode 22. In exemplary embodiments of the inventive concept, the liquid crystal molecules LC may be aligned in a vertical aligned (VA) mode. For example, the reflective display panel may be a normal black mode. When a driving voltage for driving of the reflective display panel is not provided, the reflective display panel that is the normal black mode may be black. A reflection ratio of the reflective liquid crystal display panel 120 may be changed according to the alignment of the liquid crystal molecules LC. Although the reflective liquid crystal display panel 120 that includes the reflection sheet 14 is illustrated in the FIG. 3, the reflective liquid crystal display panel 120 is not limited thereto. For example, the reflective liquid crystal display panel 120 may include a reflection electrode.

In exemplary embodiments of the inventive concept, the panel driver 140 may generate the driving voltage to drive the reflective liquid crystal display panel 120. In exemplary embodiments of the inventive concept, the panel driver 140 may generate grayscale voltages having a voltage level between a first voltage V1 and a second voltage V2 based on a driving voltage-reflection ratio property of the reflective liquid crystal display panel 120 in which a reflection ratio increases as the driving voltage increases to the first voltage V1 and decreases as the driving voltage increases from the first voltage V1 to the second voltage V2. In exemplary embodiments of the inventive concept, the panel driver 140 may generate grayscale voltages having a voltage level between the first voltage V1 and the second voltage V2 and grayscale voltages having a voltage level between a lowest voltage and a third voltage V3 based on a driving voltage-reflection ratio property that further includes the third voltage V3 lower than the first voltage V1 and having a reflection ratio corresponding to the second voltage V2.

The panel driver 140 may include a memory 141 and a grayscale voltage generator 142. Further, the panel driver 140 may include a timing controller 143, a data driver 146, and a gate driver 144.

Referring to FIG. 4A, the reflective liquid crystal display panel 120 may have a driving voltage-reflection property in which the reflection ratio increases when the driving voltage increases to the first voltage V1 and decreases when the driving voltage increases from the first voltage V1 to the second voltage V2. The reflection ratio does not decrease any more from the second voltage V2. In other words, the first voltage V1 is the driving voltage at which the reflection ratio is at a maximum (e.g., Rmax), and the second voltage V2 is the driving voltage at which the reflection ratio is at a minimum (e.g., 0). In exemplary embodiments of the inventive concept, the panel driver 140 may generate grayscale voltages having the voltage level between the first voltage V1 and the second voltage V2 based on the driving voltage-reflection ratio property.

For example, the memory 141 may store the first voltage V1 and the second voltage V2 based on the driving voltage-reflection ratio property. Here, the voltage level of the first voltage V1 is lower than the voltage level of the second voltage V2. In exemplary embodiments of the inventive concept, the grayscale voltage generator 142 may generate the grayscale voltages based on the first voltage V1 and the second voltage V2. The grayscale voltage generator 142 may generate a maximum grayscale voltage corresponding to the first voltage V1 and generate a minimum grayscale voltage corresponding to the second voltage V2. Further, the grayscale voltage generator 142 may generate voltages between the first voltage V1 and the second voltage V2 as the grayscale voltages. Here, the grayscale voltages generated in the grayscale voltage generator 142 may be reference gamma voltages.

A reflective liquid crystal display panel in prior art may generate the grayscale voltage based on the voltages lower than the first voltage V1. In this case, a response time of the liquid crystal molecules may increase because the driving voltage is relatively low. As described above, the liquid crystal display device 100 according to exemplary embodiments of the inventive concept may store the first voltage V1 and the second voltage V2 based on the driving voltage-reflection ratio property and generate the grayscale voltages having voltage levels between the first voltage V1 and the second voltage level V2 so that the response time of the liquid crystal molecules may decrease.

Referring to FIG. 4B, the driving voltage-reflection ratio property may further include the third voltage V3 lower than the first voltage V1 and having a reflection ratio corresponding to the second voltage V2. The reflective liquid crystal display panel 120 may have the driving voltage-reflection ratio property in which the reflection ratio increases when the driving voltage increases to the first voltage V1 and decreases when the driving voltage increases from the first voltage to V1 to the second voltage V2. In other words, the reflection ratio may have the highest value (e.g., the maximum reflection ratio, Rmax) at the first voltage V1 and the reflection ratio may not decrease any more at the second voltage V2. Here, the reflection ratio (e.g., a saturation reflection ratio Rsat) corresponding to the second voltage V2 may not be 0%. The third voltage V3 may have the same reflection ratio with the second voltage V2. The third voltage V3 may be lower than the first voltage V1. In exemplary embodiments of the inventive concept, the panel driver 140 may generate the grayscale voltages having voltage levels between the first voltage V1 and the second voltage V2 and the grayscale voltages having voltage levels between the lowest voltage and the third voltage V3 based on the driving voltage-reflection ratio property. Here, the lowest voltage may be 0V.

For example, the memory 141 may store the first voltage V1, the second voltage V2, and the third voltage V3 based on the driving voltage-reflection ratio property. Here, the voltage level of the first voltage V1 is higher than the voltage level of the third voltage V3, and the voltage level of the second voltage V2 is higher than the voltage level of the first voltage V1. In exemplary embodiments of the inventive concept, the grayscale voltage generator 142 may generate the grayscale voltages based on the first voltage V1, the second voltage V2, the third voltage V3, and the lowest voltage. The grayscale voltage generator 142 may generate the maximum grayscale voltage corresponding to the first voltage V1 and the minimum grayscale voltage corresponding to the lowest voltage. Further, the grayscale voltage generator 142 may generate the voltages between the first voltage V1 and the second voltage V2 and between the lowest voltage and the third voltage V3 as the grayscale voltages. Here, the voltages between the lowest voltage and the third voltage V3 may be the grayscale voltages that represent relatively low grayscales.

For example, in case that the reflection ratio corresponding to the second voltage V2 and the third voltage V3 corresponds to a k-grayscale, the grayscale voltage generator 142 may generate the voltages between the first voltage V1 and the second voltage V2 as the grayscale voltages between the maximum grayscale and the k-grayscale and generate the voltages between the third voltage V3 and the lowest voltage as the grayscale voltages between the k-grayscale and 0-grayscale. Here, the second voltage V2 and the third voltage V3 may correspond to the same reflection ratio (e.g., the saturation reflection ratio Rsat). The grayscale voltages generated in the grayscale voltage generator 142 may be the reference gamma voltages.

As described above, the liquid crystal display device 100 according to exemplary embodiments of the inventive concept may store the first voltage V1, the second voltage V2, and the third voltage V3, and generate the grayscale voltages between the first voltage V1 and the second voltage V2 and between the lowest voltage and the third voltage V3 as the grayscale voltages, so that the response time of the liquid crystal molecules LC may decrease. Operations of the memory 141 and the grayscale voltage generator 142 will be described in detail with reference to FIGS. 6A through 7B.

Although the liquid crystal display device 100 that includes the memory 141 and the grayscale voltage generator 142 coupled to the timing controller 143 and the data driver 146 is illustrated in FIG. 1, the liquid crystal display device 100 is not limited thereto. For example, the liquid crystal display device 100 may include the memory 141 and the grayscale voltage generator 142 located in the timing controller 143 or the data driver 146.

The timing controller may receive an image data RGB and a control signal CON from an external device. For example, the external device may be a graphic processor. The timing controller 143 may output image data RGB' to the data driver 146 by selectively performing a display quality compensation, an adaptive color correction (ACC), a dynamic capacitance compensation (DCC), etc. Alternatively, the timing controller 143 may provide the image data RGB provided from the external device to the data driver 146 as it is. The control signal CON may include a horizontal synchronization signal, a vertical synchronization signal, and a clock signal. The timing controller 143 may generate a horizontal start signal based on the horizontal synchronization signal. The timing controller 143 may generate a vertical start signal based on the vertical synchronization signal. The timing controller may generate a first clock signal and a second clock signal based on the clock signal. The timing controller 143 may provide the horizontal start signal and the first clock signal to the data driver 146 as a first control signal CTL1. The timing controller 143 may provide the vertical start signal and the second clock signal to the gate driver 144 as a second control signal CTL2. Further, the timing controller 143 may generate a third control signal CTL3 and provide the third control signal CTL3 to the memory 141 that stores the first voltage V1, the second voltage V2, and the third voltage V3.

The data driver 146 may generate gamma voltages based on grayscale voltages VG provided from the grayscale voltage generator 142. The grayscale voltages VG provided from the grayscale voltage generator 142 may be the reference gamma voltages. The data driver 146 may generate gamma voltages between the reference gamma voltages using gamma strings. The data driver 146 may output a data signal DATA in response to the first control signal CTL1 provided from the timing controller 143. The data driver 146 may output the gamma voltage corresponding to the image data RGB' as the data signal DATA to the data line DL, in response to the horizontal start signal and the first clock signal (e.g., the first control signal CTL1). The gate driver 144 may generate a gate signal GATE based on the second control signal CTL2 provided from the timing controller 143. The gate driver 144 may generate the gate signal GATE and output the gate signal GATE to the gate lines GL in response to the vertical start signal and the second clock signal (e.g., the second control signal CTL2).

As described above, the liquid crystal display device 100 according to exemplary embodiments of the inventive concept may store the first voltage V1, the second voltage V2, and the third voltage V3 based on the driving voltage-reflection ratio property and generate grayscale voltages VG based on the first voltage V1, the second voltage V2, and the third voltage V3, so that the response time of the liquid crystal molecules LC of the reflective liquid crystal display panel 120 may decrease.

FIG. 5 is a chart illustrating an operation property of the reflective liquid crystal display panel included in the liquid crystal display device of FIG. 1 according to an exemplary embodiment of the inventive concept.

FIG. 5 is a chart that represents the response time between 8 grayscales. In other words, the chart represents the response time of the liquid crystal molecule measured when one grayscale of the 8 grayscales is changed to another grayscale of the 8 grayscales. Here, a first grayscale may have a low-grayscale and an eighth grayscale may have a high-grayscale. Referring to FIG. 5, the response time of the liquid crystal molecule is the longest when a low-grayscale is changed to another low-grayscale.

The liquid crystal display device according to exemplary embodiments of the inventive concept may increase the voltage level applied to the liquid crystal molecule by generating a grayscale voltage higher than the first voltage V1 based on the driving voltage-reflection ratio property of the reflective liquid crystal display panel. For example, the response time of the liquid crystal may decrease by applying a relatively high voltage (e.g., higher than the first voltage V1) to the liquid crystal molecule in the low-grayscale.

Figure 6A:
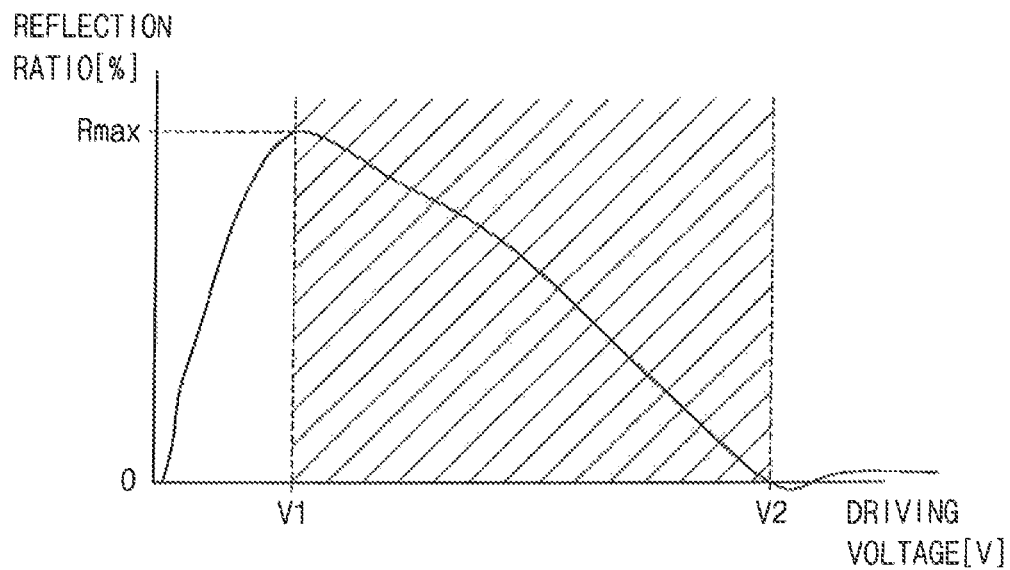
FIGS. 6A and 6B are diagrams illustrating an operation of a panel driver included in the liquid crystal display device of FIG. 1 according to an exemplary embodiment of the inventive concept.
Figure 6B:
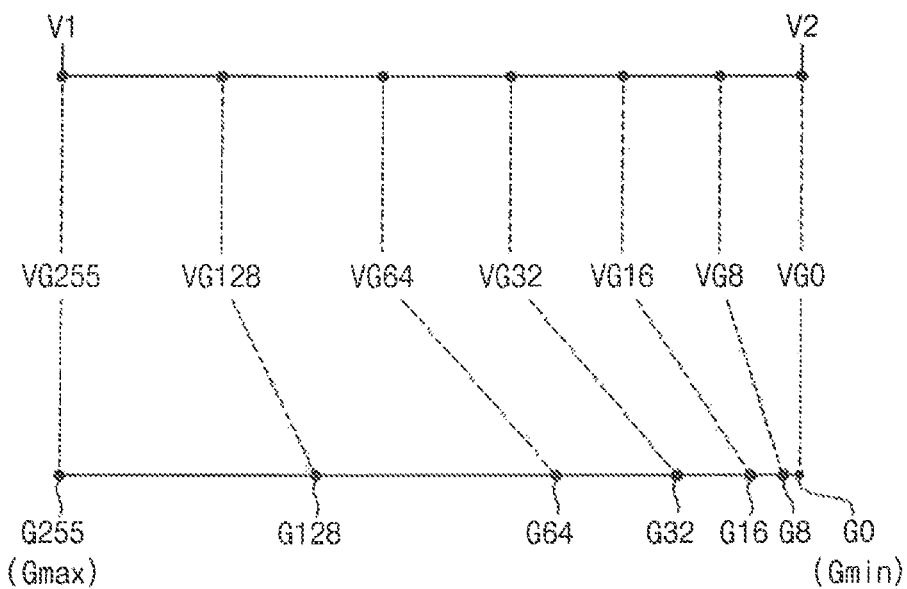

FIGS. 6A and 6B are diagrams illustrating an operation of a panel driver included in the liquid crystal display device of FIG. 1 according to an exemplary embodiment of the inventive concept.

Referring to FIG. 6A, the memory may store the first voltage V1 and the second voltage V2 based on the driving voltage-reflection ratio property of the reflective liquid crystal display panel 120. The reflective liquid crystal display panel 120 may have the driving voltage-reflection ratio property in which the reflection ratio increases as the driving voltage increases, has the maximum value (e.g., Rmax) at the first voltage V1, decreases as the driving voltage increases, and does not decrease any more at the second voltage V2, as illustrated in FIG. 6A.

As described above, the liquid crystal display device of prior art that includes a reflective liquid crystal display panel generates grayscale voltages based on a voltage lower than the first voltage V1. In this case, the grayscale voltages corresponding to the grayscales increase as the grayscale increases. However, the response time of the liquid crystal molecules may increase because the voltage level of the grayscale voltages are relatively low (e.g., lower than the first voltage V1).

On the other hand, the liquid crystal display device 100 that includes the reflective liquid crystal display panel 120 according to exemplary embodiments of the inventive concept may generate the grayscale voltages VG based on a voltage higher than the first voltage V1 so that the response time of the liquid crystal molecules LC decreases by applying a relatively high voltage (e.g., higher than the first voltage V1) to the liquid crystal molecules LC. For example, the liquid crystal display device 100 according to exemplary embodiments of the inventive concept may generate the grayscale voltage having a relatively high voltage in the low-grayscale.

Referring to FIG. 6B, the grayscale voltage generator 142 may generate grayscale voltages VG255, VG128, VG64, VG32, VG16, VG8, and VG0 based on the first voltage V1 and the second voltage V2. For example, the grayscale voltage generator 142 may generate the grayscale voltage (e.g., the maximum grayscale voltage) corresponding to a maximum grayscale Gmax based on the first voltage V1 having the maximum reflection ratio Rmax. For example, the grayscale voltage generator 142 may generate the first voltage V1 as the maximum grayscale voltage. The grayscale voltage may generate the grayscale (e.g., the minimum grayscale voltage) corresponding to a minimum grayscale Gmin based on the second voltage V2 of which the reflection ratio is 0. Here, the voltage level of the first voltage V1 is lower than the voltage level of the second voltage V2. In other words, the voltage level of the grayscale voltage corresponding to the minimum grayscale Gmin may be higher than the voltage level of the grayscale voltage corresponding to the maximum grayscale Gmax.

The grayscale voltage generator may generate the grayscale voltages based on the first voltage V1 and the second voltage V2. The grayscale voltage generator 142 may generate the grayscale voltages VG255, VG128, VG64, VG32, VG16, VG8, and VG0 that have voltage levels between the first voltage V1 and the second voltage V2 based on the property of the reflective liquid crystal display panel 120 or the image data RGB. Here, the grayscale voltages VG255, VG128, VG64, VG32, VG16, VG8, and VG0 may be provided to the data driver 146 as the reference gamma voltages. For example, when the liquid crystal display device 100 is driven in 8-bit, the grayscale voltage generator 142 may generate the first voltage V1 as the maximum grayscale voltage VG255 corresponding to the maximum grayscale (e.g., G255), generate the second voltage V2 as the minimum grayscale voltage VG0 corresponding to the minimum grayscale (e.g., G0), and generate 5 grayscale voltages VG128, VG64, VG32, VG16, and VG8 that have the voltage levels between the first voltage V1 and the second voltage V2 as the grayscale voltages respectively corresponding to 128 grayscale G128, 64 grayscale G64, 32 grayscale G32, 16 grayscale G16, and 8 grayscale G8.

As described above, the liquid crystal display device 100 according to exemplary embodiments of the inventive concept may decrease the response time of the liquid crystal molecules LC by generating grayscale voltages having a voltage level higher than the first voltage V1 based on the driving voltage-reflection ratio property of the reflective liquid crystal display panel 120.

Figure 7A:
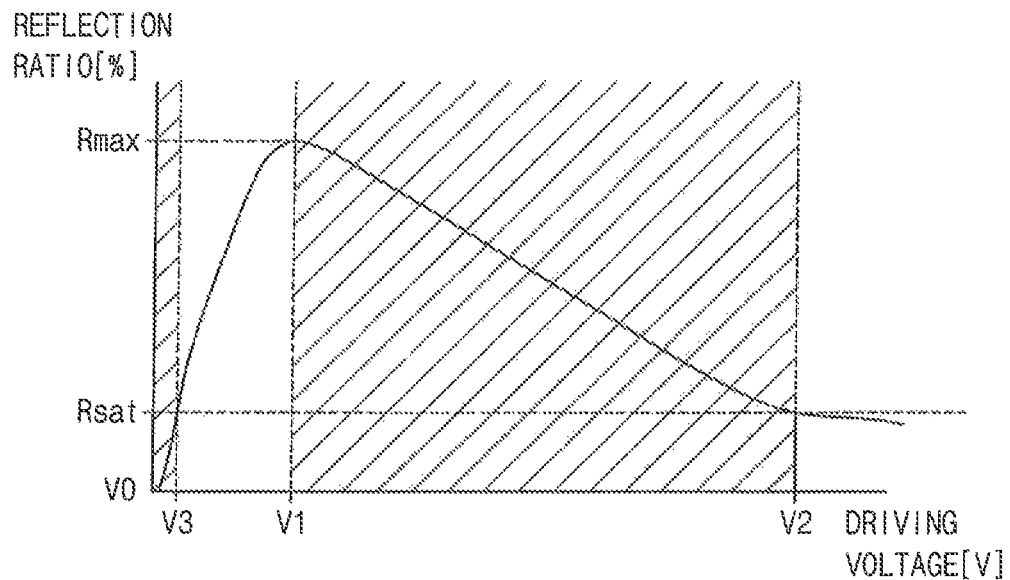
FIGS. 7A and 7B are diagrams illustrating an operation of the panel driver included in the liquid crystal display device of FIG. 1 according to an exemplary embodiment of the inventive concept.
Figure 7B:
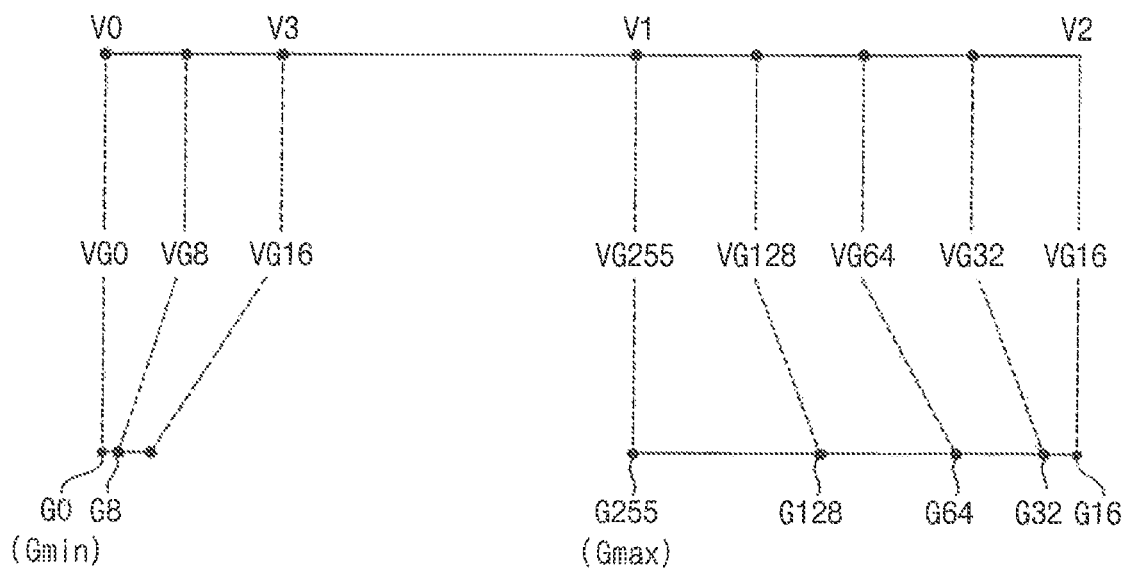

FIGS. 7A and 7B are diagrams illustrating an operation of the panel driver included in the liquid crystal display device of FIG. 1 according to an exemplary embodiment of the inventive concept.

Referring to FIG. 7A, the memory may store the first voltage V1, the second voltage V2, and the third voltage V3 based on the driving voltage-reflection ratio property of the reflective liquid crystal display panel 120. As described in FIG. 7A, the reflective liquid crystal display panel 120 may have the driving voltage-reflection ratio property in which the reflection ratio increases as the driving voltage increases, has the maximum value (e.g., Rmax) at the first voltage V1, decreases as the driving voltage increases, and does not decrease any more at the second voltage V2. Here, the reflection ratio corresponding to the second voltage V2 may not be 0%. The liquid crystal display device may use the third voltage V3 having the same reflection ratio (e.g., the saturation reflection ratio Rsat) with the second voltage V2 to generate the grayscale voltage of the grayscale corresponding to the saturation reflection ratio Rsat. In other words, the liquid crystal display device may generate the grayscale voltages of the grayscales between the grayscale corresponding to the maximum reflection Rmax and the grayscale corresponding to the saturation reflection ratio Rsat based on the first voltage V1 and the second voltage V2, and generate the grayscale voltages of the grayscales between the grayscale corresponding to the minimum reflection ratio (e.g., 0%) and the grayscale corresponding to the saturation reflection ratio Rsat based on the lowest voltage V0 (e.g., 0V) and the third voltage V3.

Referring to FIG. 7B, the grayscale voltage generator 142 may generate grayscale voltages VG255, VG128, VG64, VG32, VG16, VG8, and VG0 based on the first voltage V1, the second voltage V2, the third voltage V3, and the lowest voltage V0. For example, the grayscale voltage generator may generate grayscale voltage (e.g., the maximum grayscale voltage) corresponding to the maximum grayscale Gmax based on the first voltage V1 having the maximum reflection ratio Rmax. For example, the grayscale voltage generator 142 may generate the first voltage V1 as the maximum grayscale voltage. The grayscale voltage generator 142 may generate the grayscale voltage corresponding to a certain grayscale based on the second voltage V2 having the saturation reflection ratio Rsat. For example, the grayscale voltage generator 142 may generate the second voltage V2 as the grayscale voltage VG16 corresponding to the 16 grayscale G16. The grayscale voltage generator 142 may generate the grayscale voltages based on the first voltage V1 and the second voltage V2. The grayscale voltage generator 142 may generate the voltages having voltage levels between the first voltage V1 and the second voltage V2 based on the property of the reflective liquid crystal display panel 120 or the input image signal RGB. Here, the grayscale voltages may be provided to the data driver 146 as the reference gamma voltages. For example, when the liquid crystal display device 100 is driven in 8-bit, the grayscale voltage generator 142 may generate the first voltage V1 as the maximum grayscale voltage VG255 corresponding to the maximum grayscale Gmax (e.g., G255), generate the second voltage V2 as the grayscale voltage VG16 corresponding to the 16 grayscale G16, and generate 3 voltages having voltage levels between the first voltage V1 and the second voltage V2 as the grayscale voltages VG128, VG64, and VG32 respectively corresponding to the 128 grayscale G128, the 64 grayscale G64, and the 32 grayscale G32.

Further, the grayscale voltage generator 142 may generate a grayscale voltage corresponding to the minimum grayscale G0 based on the lowest voltage V0 having the minimum reflection ratio (e.g., 0%). For example, the grayscale voltage generator 142 may generate the lowest voltage V0 as the minimum grayscale voltage VG0. The grayscale voltage generator 142 may generate the grayscale voltage corresponding to a certain grayscale based on the third voltage V3 having the saturation reflection ratio Rsat. For example, the grayscale voltage generator 142 may generate the third voltage V3 as the grayscale voltage VG16 corresponding to the 16 grayscale G16. The grayscale voltage generator 142 may generate the grayscale voltages based on the lowest voltage V0 and the third voltage V3. The grayscale voltage generator 142 may generate the voltages having voltage levels between the lowest voltage V0 and the third voltage V3 as the grayscale voltages based on the property of the reflective liquid crystal display panel 120 or the input image signal RGB. Here, the grayscale voltages may be provided to the data driver 146 as the reference gamma voltage. For example, when the liquid crystal display device is driven in 8-bit, the grayscale voltage generator may generate the lowest voltage V0 as the minimum grayscale voltage VG0 corresponding to the minimum grayscale G0, generate the third voltage V3 as the grayscale voltage VG16 corresponding to the 16 grayscale G16, and generate one voltage VG8 between the lowest voltage V0 and the third voltage V3 as the grayscale voltage VG8 corresponding to the 8 grayscale G8.

Here, the grayscale voltage generator 142 may generate the grayscale voltage VG16 corresponding to the 16 grayscale based on one of the second voltage V2 and the third voltage V3.

As described above, the liquid crystal display device 100 according to exemplary embodiments of the inventive concept may generate the grayscale voltages having the voltage levels between the first voltage V1 and the second voltage V2 and generate the grayscale voltages having the voltage levels between the lowest voltage V0 and the third voltage V3 so that the response time of the liquid crystal molecules LC may decrease.

Figure 8:
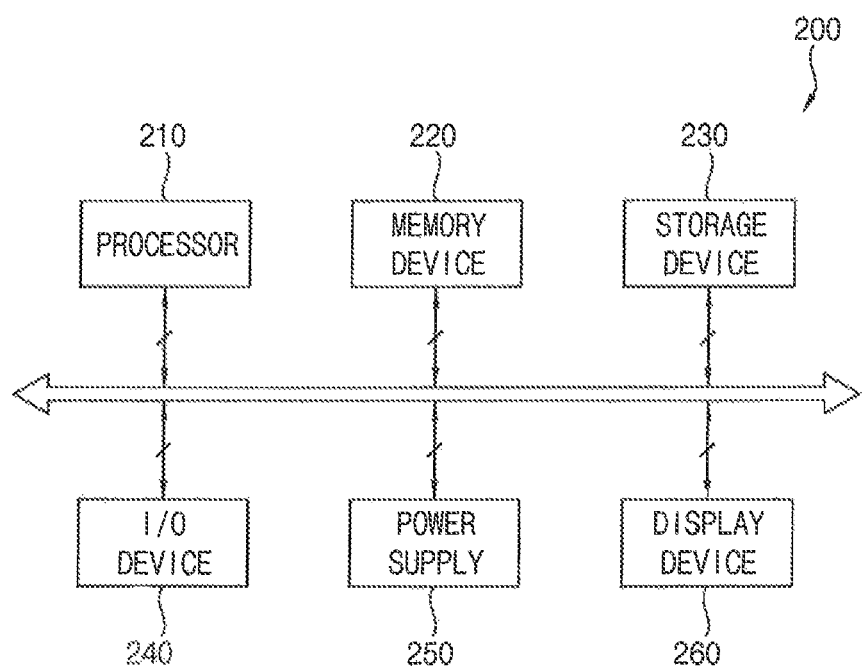
FIG. 8 is a block diagram illustrating an electronic device that includes the liquid crystal display device of FIG. 1 according to an exemplary embodiment of the inventive concept.
Figure 9:
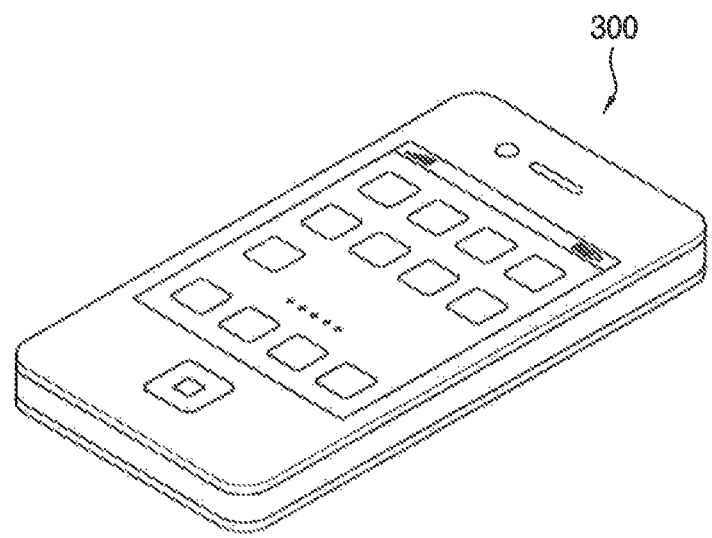
FIG. 9 is a diagram illustrating an exemplary embodiment of the inventive concept in which the electronic device of FIG. 8 is implemented as a smartphone.

FIG. 8 is a block diagram illustrating an electronic device that includes the liquid crystal display device of FIG. 1 according to an exemplary embodiment of the inventive concept. FIG. 9 is a diagram illustrating an exemplary embodiment of the inventive concept in which the electronic device of FIG. 8 is implemented as a smartphone.

Referring to FIGS. 8 and 9, an electronic device 200 may include a processor 210, a memory device 220, a storage device 230, an input/output (I/O) device 240, a power device 250, and a display device 260. Here, the display device 260 may correspond to the liquid crystal display device 100 of FIG. 1. In addition, the electronic device 200 may further include a plurality of ports for communicating with a video card, a sound card, a memory card, a universal serial bus (USB) device, other electronic device, etc. Although it is illustrated in FIG. 9 that the electronic device 200 is implemented as a smartphone 300, the electronic device 200 is not limited thereto.

The processor 210 may perform various computing functions. The processor 210 may be a micro processor, a central processing unit (CPU), etc. The processor 210 may be coupled to other components via an address bus, a control bus, a data bus, etc. Further, the processor 210 may be coupled to an extended bus such as peripheral component interconnect (PCI) bus. The memory device 220 may store data for operations of the electronic device 200. For example, the memory device 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 230 may be a solid state drive (SSD) device, a hard disk drive (HDD) device, a CD-ROM device, etc.

The I/O device 240 may be an input device such as a keyboard, a keypad, a touchpad, a touch-screen, a mouse, etc, and an output device such as a printer, a speaker, etc. In exemplary embodiments of the inventive concept, the display device 260 may be included in the I/O device 240. The power device 250 may provide power for operations of the electronic device 200. The display device 260 may communicate with other components via the buses or other communication links.

As described above, the display device 260 may include a reflective liquid crystal display panel and a panel driver. The reflective liquid crystal display panel may display an image by reflecting incident light using natural light. The reflective liquid crystal display panel may include a first substrate, a second substrate, and a liquid crystal layer. Here, the first substrate may include a reflective sheet or reflective electrodes so that the reflective liquid crystal display panel may be implemented. The panel driver may generate a driving voltage to drive the reflective liquid crystal display panel. The panel driver may include a memory and a grayscale voltage generator. Further, the panel driver may include a timing controller, a data driver, and a gate driver.

In exemplary embodiments of the inventive concept, the reflective liquid crystal display panel may have a driving voltage-reflective ratio property in which a reflective ratio of the reflective liquid crystal display panel increases when the driving voltage increases to a first voltage and decreases when the driving voltage increases from the first voltage to a second voltage. The panel driver may generate grayscale voltages having voltage levels between the first voltage and the second voltage. The grayscale voltage generator may generate a maximum grayscale voltage corresponding to the first voltage and a minimum grayscale voltage corresponding to the second voltage. Further, the grayscale voltage generator may generate voltages between the first voltage and the second voltage as the grayscale voltages. Here, the grayscale voltages generated in the grayscale voltage generator may be reference gamma voltages.

In exemplary embodiments of the inventive concept, the reflective liquid crystal display panel may have a driving voltage-reflective ratio property that further include a third voltage lower than the first voltage and having a reflection ratio corresponding to the second voltage. The panel driver may generate the grayscale voltages having voltage levels between the first voltage and the second voltage and generate the grayscale voltages having voltage levels between a lowest voltage and the third voltage. Here, the lowest voltage may be 0V. The grayscale voltage generator may generate the maximum grayscale voltage corresponding to the first voltage and the minimum grayscale voltage corresponding to the lowest voltage. Further, the grayscale voltage generator may generate voltages between the first voltage and the second voltage as the grayscale voltages and generate the voltages between the lowest voltage and the third voltage as the grayscale voltages.

As described above, the electronic device 200 according to exemplary embodiments of the inventive concept may include the display device 260 that generates grayscale voltages having the voltage level higher than the first voltage corresponding to the maximum reflection ratio, based on the driving voltage-reflection ratio property of the reflective liquid crystal panel, so that the response time of the liquid crystal molecules may decrease. Thus, display quality of the display device 260 may improve.

The inventive concept may be applied to a display device and an electronic device having the display device. For example, the inventive concept may be applied to a computer monitor, a laptop, a digital camera, a cellular phone, a smartphone, a smart pad, a television, a personal digital assistant (PDA), a portable multimedia player (PMP), a MP3 player, a navigation system, a game console, a video phone, etc.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. A liquid crystal display device comprising:
   a reflective liquid crystal display panel; and
   a panel driver configured to generate a driving voltage to drive the reflective liquid crystal display panel,
   wherein the panel driver generates grayscale voltages having a voltage level between a first voltage and a second voltage based on a driving voltage-reflection ratio property in which a reflection ratio increases when the driving voltage increases to the first voltage and the reflection ratio decreases when the driving voltage increases from the first voltage to the second voltage, and wherein the first voltage corresponds to a maximum grayscale voltage and comprises a third voltage level generated by the panel driver that results in the reflection ratio being greater than a threshold reflection ratio corresponding to the second voltage.

2. The liquid crystal display device of claim 1, wherein the reflective liquid crystal display panel includes:
   a first substrate including a first base substrate, a thin film transistor disposed on the first base substrate, a color filter layer disposed on the thin film transistor, a pixel electrode disposed on the color filter layer and electrically connected to a drain electrode of the thin film transistor, and a reflection sheet disposed between the thin film transistor and the color filter layer and configured to reflect external light;
   a second substrate including a second base substrate facing the first base substrate, a common electrode disposed on a first surface of the second base substrate, and a light control film disposed on a second surface of the second base substrate opposite to the first surface; and
   a liquid crystal layer disposed between the first substrate and the second substrate.

3. The liquid crystal display device of claim 2, wherein liquid crystal molecules in the liquid crystal layer are aligned in a vertical aligned (VA) mode.

4. The liquid crystal display device of claim 1, wherein the reflective display panel is a normal black mode.

5. The liquid crystal display device of claim 1, wherein a voltage level of the first voltage is lower than a voltage level of the second voltage.

6. The liquid crystal display device of claim 1, wherein the panel driver includes:
   a memory configured to store the first voltage and the second voltage; and
   a grayscale voltage generator configured to generate the grayscale voltages using the first voltage and the second voltage.

7. The liquid crystal display device of claim 6, wherein the second voltage corresponds to a minimum grayscale voltage.

8. The liquid crystal display device of claim 6, wherein the panel driver generates the grayscale voltages having a voltage level between the first voltage and the second voltage and the grayscale voltages having a voltage level between a lowest voltage and the third voltage based on the driving voltage-reflection ratio property that further includes the third voltage lower than the first voltage and having a reflection ratio corresponding to the second voltage.

9. The liquid crystal display device of claim 8, wherein a voltage level of the first voltage is higher than a voltage level of the third voltage, and
   wherein a voltage level of the second voltage is higher than the voltage level of the first voltage.

10. The liquid crystal display device of claim 8, wherein the memory is further configured to store the third voltage, and
    the grayscale voltage generator is further configured to generate the grayscale voltages using the third voltage and the lowest voltage.

11. The liquid crystal display device of claim 10, wherein the lowest voltage corresponds to a minimum grayscale voltage, and
    wherein the second voltage and the third voltage corresponds to a grayscale voltage lower than the maximum grayscale voltage and higher than the minimum grayscale voltage.

12. A driving device of a reflective liquid crystal display panel comprising:
    a memory configured to store a first voltage and a second voltage based on a driving voltage-reflection ratio property of the reflective liquid crystal display panel in which a reflection ratio increases when a driving voltage increases to the first voltage and the reflection ratio decreases when the driving voltage increases from the first voltage to the second voltage; and
    a grayscale voltage generator configured to generate grayscale voltages using the first voltage and the second voltage,
    wherein the memory stores the first voltage, the second voltage, and a third voltage based on the driving voltage-reflection ratio property that further includes the third voltage lower than the first voltage and having a reflection ratio corresponding to the second voltage, and
    wherein the grayscale voltage generator generates the grayscale voltages having a voltage level between the first voltage and the second voltage and the grayscale voltages having a voltage level between a lowest voltage and the third voltage.

13. The driving device of the liquid crystal display panel of claim 12, wherein the reflective liquid crystal display panel is a normal black mode.

14. The driving device of the liquid crystal display panel of claim 12, wherein a voltage level of the first voltage is lower than a voltage level of the second voltage.

15. The driving device of the liquid crystal display panel of claim 12, wherein a voltage level of the first voltage is higher than a voltage level of the third voltage, and
wherein a voltage level of the second voltage is higher than the voltage level of the first voltage.

16. The driving device of the liquid crystal display panel of claim 15, wherein the first voltage corresponds to a maximum grayscale voltage,
wherein the lowest voltage corresponds to a minimum grayscale voltage, and
wherein the second voltage and the third voltage corresponds to a grayscale voltage lower than the maximum grayscale voltage and higher than the minimum grayscale voltage.

17. A liquid crystal device comprising:
a reflective liquid crystal display panel;
a memory configured to store and provide a first voltage, a second voltage, and a third voltage;
a grayscale voltage generator configured to receive the first voltage, the second voltage, and the third voltage, and generate grayscale voltages having a voltage level between the first voltage and the second voltage and grayscale voltages having a voltage level between a lowest voltage and the third voltage; and
a data driver configured to output a data signal to the reflective liquid crystal display panel using the grayscale voltages,
wherein a voltage level of the first voltage is higher than a voltage level of the third voltage, a voltage level of the second voltage is higher than the voltage level of the first voltage, the first voltage corresponds to a maximum grayscale voltage, the lowest voltage corresponds to a minimum grayscale voltage, and the second voltage and the third voltage corresponds to a grayscale voltage lower than the maximum grayscale voltage and higher than the minimum grayscale voltage.

* * * * *